United States Patent
Nishikawa

(10) Patent No.: US 10,730,290 B2
(45) Date of Patent: Aug. 4, 2020

(54) RECORDING APPARATUS AND CONTROL METHOD THEREFOR

(71) Applicant: CANON KABUSHIKI KAISHA, Tokyo (JP)

(72) Inventor: Yukinori Nishikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/144,660

(22) Filed: Sep. 27, 2018

(65) Prior Publication Data

US 2019/0100000 A1 Apr. 4, 2019

(30) Foreign Application Priority Data

Oct. 2, 2017 (JP) .................................. 2017-192648

(51) Int. Cl.
  *B41J 2/045* (2006.01)
  *B41J 29/38* (2006.01)
  *B41J 29/26* (2006.01)
  *G06K 15/02* (2006.01)
  *G06K 15/00* (2006.01)

(52) U.S. Cl.
  CPC ....... *B41J 2/04586* (2013.01); *B41J 2/04508* (2013.01); *B41J 2/04541* (2013.01); *B41J 29/26* (2013.01); *B41J 29/38* (2013.01); *G06K 15/00* (2013.01); *G06K 15/186* (2013.01); *G06K 15/1894* (2013.01)

(58) Field of Classification Search
  None
  See application file for complete search history.

(56) References Cited

U.S. PATENT DOCUMENTS

2017/0242633 A1* 8/2017 Martin .................... G06F 3/121
2018/0232178 A1* 8/2018 Iwaki .................... G06F 3/0659
2019/0030883 A1* 1/2019 Kawamoto .......... B41J 2/04541

FOREIGN PATENT DOCUMENTS

JP        2013-043330 A    3/2013

* cited by examiner

*Primary Examiner* — Fan Zhang
(74) *Attorney, Agent, or Firm* — Canon U.S.A., Inc. IP Division

(57) ABSTRACT

A recording apparatus performs converting each of recording data and control data for controlling a recording head into transfer data in a command format and transmitting the transfer data to the recording head via a transmission path, and detecting, in the recording head, an error in the received transfer data, and, in the transmission after detecting the error, reconstructs next transfer data in such a manner that a command that has been included in the transfer data in which the error has occurred among commands concerning the control data and that is scheduled not to be included in the next transfer data is included in the next transfer data, and then transmits the next transfer data reconstructed.

10 Claims, 15 Drawing Sheets

FIG.6

| | NUMBER OF DATA BITS | COMMAND CONTENT | |
|---|---|---|---|
| ◎ | 8 | START | TRANSFER IN SEQUENCE ↓ |
| ◎ | 8 | RECORDING DATA | |
| | 8 | DATA LENGTH / BLK Num | |
| | 24 | RECORDING DATA BODY | |
| ◎ | 8 | RECORDING DATA | |
| | 8 | DATA LENGTH / BLK Num | |
| | 24 | RECORDING DATA BODY | |
| ◎ | 8 | RECORDING DATA | |
| | 8 | DATA LENGTH / BLK Num | |
| | 24 | RECORDING DATA BODY | |
| ◎ | 8 | RECORDING DATA | |
| | 8 | DATA LENGTH / BLK Num | |
| | 24 | RECORDING DATA BODY | |
| ◎ | 8 | RECORDING DATA | |
| | 8 | DATA LENGTH / BLK Num | |
| | 24 | RECORDING DATA BODY | |
| ◎ | 8 | RECORDING DATA | |
| | 8 | DATA LENGTH / BLK Num | |
| | 24 | RECORDING DATA BODY | |
| ◎ | 8 | HE TIMING (PT0) | |
| | 8 | HE PT0 TIMING VALUE | |
| ◎ | 8 | HE TIMING (PT1) | |
| | 8 | HE PT1 TIMING VALUE | |
| ◎ | 8 | HE TIMING (PT2) | |
| | 8 | HE PT2 TIMING VALUE | |
| ◎ | 8 | HE TIMING (PT3) | |
| | 8 | HE PT3 TIMING VALUE | |
| ◎ | 8 | SUB-HEATER | |
| | 8 | SUB-HEATER DATA | |
| ◎ | 8 | CRC | |
| | 8 | CRC DATA | |

FIG.7

| COMMAND NAME | FIRST BYTE (COMMAND SELECTION) | | | | | | | | SECOND BYTE (DATA) | | | | | | | | THIRD BYTE (DATA) | | | | | | | |
|---|---|---|---|---|---|---|---|---|---|---|---|---|---|---|---|---|---|---|---|---|---|---|---|---|
| | D7 | D6 | D5 | D4 | D3 | D2 | D1 | D0 | D7 | D6 | D5 | D4 | D3 | D2 | D1 | D0 | D7 | D6 | D5 | D4 | D3 | D2 | D1 | D0 |
| RECORDING DATA Bk0 | 1 | 0 | 0 | 0 | 0 | 0 | 0 | 0 | x | x | x | x | BLOCK NUMBER | | | | RECORDING DATA BODY (UP TO FIFTH BYTE) | | | | | | | |
| RECORDING DATA Bk1 | 1 | 0 | 0 | 0 | 0 | 0 | 0 | 1 | x | x | x | x | BLOCK NUMBER | | | | RECORDING DATA BODY (UP TO FIFTH BYTE) | | | | | | | |
| RECORDING DATA C0 | 1 | 0 | 0 | 0 | 0 | 0 | 1 | 0 | x | x | x | x | BLOCK NUMBER | | | | RECORDING DATA BODY (UP TO FIFTH BYTE) | | | | | | | |
| RECORDING DATA C1 | 1 | 0 | 0 | 0 | 0 | 0 | 1 | 1 | x | x | x | x | BLOCK NUMBER | | | | RECORDING DATA BODY (UP TO FIFTH BYTE) | | | | | | | |
| RECORDING DATA M0 | 1 | 0 | 0 | 0 | 0 | 1 | 0 | 0 | x | x | x | x | BLOCK NUMBER | | | | RECORDING DATA BODY (UP TO FIFTH BYTE) | | | | | | | |
| RECORDING DATA M1 | 1 | 0 | 0 | 0 | 0 | 1 | 0 | 1 | x | x | x | x | BLOCK NUMBER | | | | RECORDING DATA BODY (UP TO FIFTH BYTE) | | | | | | | |
| RECORDING DATA Y0 | 1 | 0 | 0 | 0 | 0 | 1 | 1 | 0 | x | x | x | x | BLOCK NUMBER | | | | RECORDING DATA BODY (UP TO FIFTH BYTE) | | | | | | | |
| RECORDING DATA Y1 | 1 | 0 | 0 | 0 | 0 | 1 | 1 | 1 | x | x | x | x | BLOCK NUMBER | | | | RECORDING DATA BODY (UP TO FIFTH BYTE) | | | | | | | |
| HE TIMING (PT0) | 0 | 1 | 0 | 0 | 0 | 0 | 0 | 0 | TIMING DATA | | | | | | | | | | | | | | | |
| HE TIMING (PT1) | 0 | 1 | 0 | 0 | 0 | 0 | 0 | 1 | TIMING DATA | | | | | | | | | | | | | | | |
| HE TIMING (PT2) | 0 | 1 | 0 | 0 | 0 | 0 | 1 | 0 | TIMING DATA | | | | | | | | | | | | | | | |
| HE TIMING (PT3) | 0 | 1 | 0 | 0 | 0 | 0 | 1 | 1 | TIMING DATA | | | | | | | | | | | | | | | |
| SUB-HEATER | 0 | 1 | 0 | 1 | x | x | x | x | x | x | x | x | x | x | x | ☆ | | | | | | | | |
| CRC | 1 | 1 | 1 | x | x | x | x | x | CRC DETECTION DATA | | | | | | | | | | | | | | | |
| START | 1 | 0 | 1 | x | x | x | x | x | | | | | | | | | | | | | | | | | x : DON'T CARE
☆ : SUB-HEATER DATA (0: OFF, 1: ON)

FIG.11

| NUMBER OF DATA BITS | COMMAND CONTENT |
|---|---|
| 8 | START |
| 8 | RECORDING DATA |
| 8 | DATA LENGTH / BLK Num |
| 24 | RECORDING DATA BODY |
| 8 | RECORDING DATA |
| 8 | DATA LENGTH / BLK Num |
| 24 | RECORDING DATA BODY |
| 8 | RECORDING DATA |
| 8 | DATA LENGTH / BLK Num |
| 24 | RECORDING DATA BODY |
| 8 | RECORDING DATA |
| 8 | DATA LENGTH / BLK Num |
| 24 | RECORDING DATA BODY |
| 8 | RECORDING DATA |
| 8 | DATA LENGTH / BLK Num |
| 24 | RECORDING DATA BODY |
| 8 | RECORDING DATA |
| 8 | DATA LENGTH / BLK Num |
| 24 | RECORDING DATA BODY |
| 8 | HE TIMING (PT1) |
| 8 | HE PT1 TIMING VALUE |
| 8 | CRC |
| 8 | CRC DATA |

TRANSFER IN SEQUENCE

FIG. 13A n-TH TRANSFER DATA

| NUMBER OF DATA BITS | COMMAND CONTENT | TRANSFER IN SEQUENCE |
|---|---|---|
| 8 | START | ◎ |
| 8 | RECORDING DATA | ◎ |
| 8 | DATA LENGTH / BLK Num | ◎ |
| 24 | RECORDING DATA BODY | ◎ |
| 8 | RECORDING DATA | ◎ |
| 8 | DATA LENGTH / BLK Num | |
| 24 | RECORDING DATA BODY | |
| 8 | RECORDING DATA | |
| 8 | DATA LENGTH / BLK Num | |
| 24 | RECORDING DATA BODY | |
| 8 | RECORDING DATA | |
| 8 | DATA LENGTH / BLK Num | |
| 24 | RECORDING DATA BODY | |
| 8 | RECORDING DATA | |
| 8 | DATA LENGTH / BLK Num | |
| 24 | RECORDING DATA BODY | |
| 8 | HE TIMING (PT1) | |
| 8 | HE PT1 TIMING VALUE | |
| 8 | CRC | |
| 8 | CRC DATA | |

FIG. 13B (n+1)-TH TRANSFER DATA (AT THE NORMAL TIME)

| NUMBER OF DATA BITS | COMMAND CONTENT | TRANSFER IN SEQUENCE |
|---|---|---|
| 8 | START | ◎ |
| 8 | RECORDING DATA | ◎ |
| 8 | DATA LENGTH / BLK Num | ◎ |
| 24 | RECORDING DATA BODY | ◎ |
| 8 | RECORDING DATA | ◎ |
| 8 | DATA LENGTH / BLK Num | |
| 24 | RECORDING DATA BODY | |
| 8 | RECORDING DATA | |
| 8 | DATA LENGTH / BLK Num | |
| 24 | RECORDING DATA BODY | |
| 8 | RECORDING DATA | |
| 8 | DATA LENGTH / BLK Num | |
| 24 | RECORDING DATA BODY | |
| 8 | RECORDING DATA | ◎ |
| 8 | DATA LENGTH / BLK Num | ◎ |
| 24 | RECORDING DATA BODY | ◎ |
| 8 | SUB-HEATER | ◎ |
| 8 | SUB-HEATER DATA | ◎ |
| 8 | CRC | |
| 8 | CRC DATA | |

FIG. 13C (n+1)-TH TRANSFER DATA (AT THE TIME OF OCCURRENCE OF ERROR IN n-TH TRANSFER DATA)

| NUMBER OF DATA BITS | COMMAND CONTENT | TRANSFER IN SEQUENCE |
|---|---|---|
| 8 | START | ◎ |
| 8 | RECORDING DATA | ◎ |
| 8 | DATA LENGTH / BLK Num | ◎ |
| 24 | RECORDING DATA BODY | ◎ |
| 8 | RECORDING DATA | ◎ |
| 8 | DATA LENGTH / BLK Num | ◎ |
| 24 | RECORDING DATA BODY | ◎ |
| 8 | RECORDING DATA | ◎ |
| 8 | DATA LENGTH / BLK Num | ◎ |
| 24 | RECORDING DATA BODY | ◎ |
| 8 | RECORDING DATA | ◎ |
| 8 | DATA LENGTH / BLK Num | ◎ |
| 24 | RECORDING DATA BODY | ◎ |
| 8 | RECORDING DATA | ◎ |
| 8 | DATA LENGTH / BLK Num | ◎ |
| 24 | RECORDING DATA BODY | REPLACE |
| 8 | HE TIMING (PT1) | ◎ |
| 8 | HE PT1 TIMING VALUE | ◎ |
| 8 | CRC | |
| 8 | CRC DATA | |

FIG. 13D (n+2)-TH TRANSFER DATA (AT THE TIME OF OCCURRENCE OF ERROR IN n-TH TRANSFER DATA)

| NUMBER OF DATA BITS | COMMAND CONTENT | TRANSFER IN SEQUENCE |
|---|---|---|
| 8 | START | ◎ |
| 8 | RECORDING DATA | ◎ |
| 8 | DATA LENGTH / BLK Num | |
| 24 | RECORDING DATA BODY | |
| 8 | RECORDING DATA | ◎ |
| 8 | DATA LENGTH / BLK Num | |
| 24 | RECORDING DATA BODY | |
| 8 | RECORDING DATA | ◎ |
| 8 | DATA LENGTH / BLK Num | |
| 24 | RECORDING DATA BODY | |
| 8 | RECORDING DATA | ◎ |
| 8 | DATA LENGTH / BLK Num | |
| 24 | RECORDING DATA BODY | |
| 8 | RECORDING DATA | ◎ |
| 8 | DATA LENGTH / BLK Num | |
| 24 | RECORDING DATA BODY | |
| 8 | SUB-HEATER | ◎ |
| 8 | SUB-HEATER DATA | ◎ |
| 8 | CRC | |
| 8 | CRC DATA | |

FIG.15

| NUMBER OF DATA BITS | COMMAND CONTENT |
|---|---|
| ◎ 8 | START |
| ◎ 8 | RECORDING DATA |
| 8 | DATA LENGTH / BLK Num |
| 24 | RECORDING DATA BODY |
| ◎ 8 | RECORDING DATA |
| 8 | DATA LENGTH / BLK Num |
| 24 | RECORDING DATA BODY |
| ◎ 8 | RECORDING DATA |
| 8 | DATA LENGTH / BLK Num |
| 24 | RECORDING DATA BODY |
| ◎ 8 | RECORDING DATA |
| 8 | DATA LENGTH / BLK Num |
| 24 | RECORDING DATA BODY |
| ◎ 8 | RECORDING DATA |
| 8 | DATA LENGTH / BLK Num |
| 24 | RECORDING DATA BODY |
| ◎ 8 | RECORDING DATA |
| 8 | DATA LENGTH / BLK Num |
| 24 | RECORDING DATA BODY |
| ◎ 8 | HE TIMING (PT1) |
| 8 | HE PT1 TIMING VALUE |
| ◎ 8 | CRC |
| 8 | CRC DATA |

TRANSFER IN SEQUENCE

CRC APPLICABLE DATA RANGE

RECORDING APPARATUS AND CONTROL METHOD THEREFOR

BACKGROUND OF THE INVENTION

Field of the Invention

Aspects of the present invention generally relate to a recording apparatus which records, for example, an image on a recording medium and a control method for the recording apparatus.

Description of the Related Art

In a recording apparatus which records or prints, for example, an image on a recording medium such as paper, generally, a recording head, which includes a plurality of recording elements and performs an actual recording operation, and a main body portion, which includes a controller that controls the recording head, are provided separately from each other. To perform recording on the entire surface of the recording medium, a configuration in which the recording head relatively moves with respect to the main body portion is often employed. One type of recording apparatuses in which a recording head and a main body portion are provided separately from each other includes an inkjet recording apparatus which is also capable of performing image recording with colors (multiple colors) by ejecting recording liquids (ink) from discharge ports. The inkjet recording apparatus is increasingly demanded in a wide range of industrial fields as a relatively simplified and excellent recording apparatus, and is thus requested to be able to perform recording at higher speed and to be able to perform recording of a higher-quality image.

In the form of responding to a request for an improvement in recording speed, with regard to an inkjet recording apparatus, for example, attempts to increase the number of discharge ports provided in the recording head and to heighten the ejection frequency are being performed. Along with this, with regard to control data which is transferred from the controller to the recording head, the amount of transfer per unit time increases, and, in addition, the transfer period also shortens, so that the transfer frequency rises. The control data is data used to control an operation of the recording head, and includes, for example, data used to designate a waveform for driving recording elements provided in the recording head. As a method of responding to an increase in the amount of transfer data and a rise in the transfer frequency, Japanese Patent Application Laid-Open No. 2013-043330 discusses a method in which the controller converts control data into a command and transfer the command to the recording head and the recording head decodes the received command into control data. In some types of recording apparatuses other than the inkjet recording apparatus, a method in which control data for a recording head is converted into a command and the command is then transferred to the recording head is also employed.

Even if control data is converted into a command and the command is then transferred, in a case where it is attempted to further shorten the transfer period of control data for a recording head, it gradually becomes difficult to transfer all of the commands to the recording head with every transfer period. To address such a situation, employing a configuration in which each command is transferred only when needed, for example, only when a change has been made to data corresponding to the command, can be considered. However, if such a configuration is employed, when there is an error in a command or control data corresponding thereto, the error would continue until the next command is received, so that recording may become inappropriate or a malfunction of the recording head itself may be caused. For example, in a case where, in control data, there is an error in a portion for setting drive waveforms for recording elements, drive waveform setting data stored inside the recording head is not updated, so that the recording elements would be driven based on old data to perform recording. In that case, energy supplied to the recording elements becomes insufficient or excessive as compared with energy to be originally supplied thereto, and, as a result, appropriate recording, for example, image formation, cannot be performed. Additionally, when such a condition continues, unwanted stress is imparted to the recording head, so that a malfunction of the recording head may occur. Such issues in a case where an error occurs in transfer data for a recording head may be encountered in not only an inkjet recording apparatus but also other types of recording apparatuses.

SUMMARY OF THE INVENTION

Aspects of the present invention are generally directed to providing a recording apparatus which is capable of avoiding a situation in which, when an error occurs in transfer data for a recording head, a malfunction of the recording head is caused by the error, and to providing a control method for the recording apparatus.

According to an aspect of the present invention, a recording apparatus which includes a recording head including a plurality of recording elements and which performs recording based on recording data on a recording medium by driving the plurality of recording elements includes a controller connected to the recording head via a transmission path and configured to convert each of the recording data and control data for controlling the recording head into transfer data in a command format and to transmit the transfer data to the recording head, and an error detection unit provided at the recording head and configured to detect an error in the transfer data received by the recording head and to transmit a signal indicating detection of the error to the controller, wherein, upon receiving the signal indicating detection of the error, the controller reconstructs next transfer data in such a manner that a command that has been included in the transfer data in which the error has occurred among commands concerning the control data and that is scheduled not to be included in the next transfer data is included in the next transfer data, and then transmits the next transfer data reconstructed.

Further features of the present invention will become apparent from the following description of exemplary embodiments with reference to the attached drawings.

BRIEF DESCRIPTION OF THE DRAWINGS

FIG. 6 is a diagram illustrating an example of a structure of data to be transferred to a recording head.

FIG. 7 is a diagram illustrating formats of the respective commands in transfer data.

FIG. 11 is a diagram illustrating a modification example of transfer data for the recording head.

FIGS. 13A, 13B, 13C, and 13D are diagrams illustrating examples of commands to be transferred at the time of occurrence of an error.

FIG. 15 is a diagram illustrating another example of a range targeted for CRC inspection.

DESCRIPTION OF THE EMBODIMENTS

Figure 1:
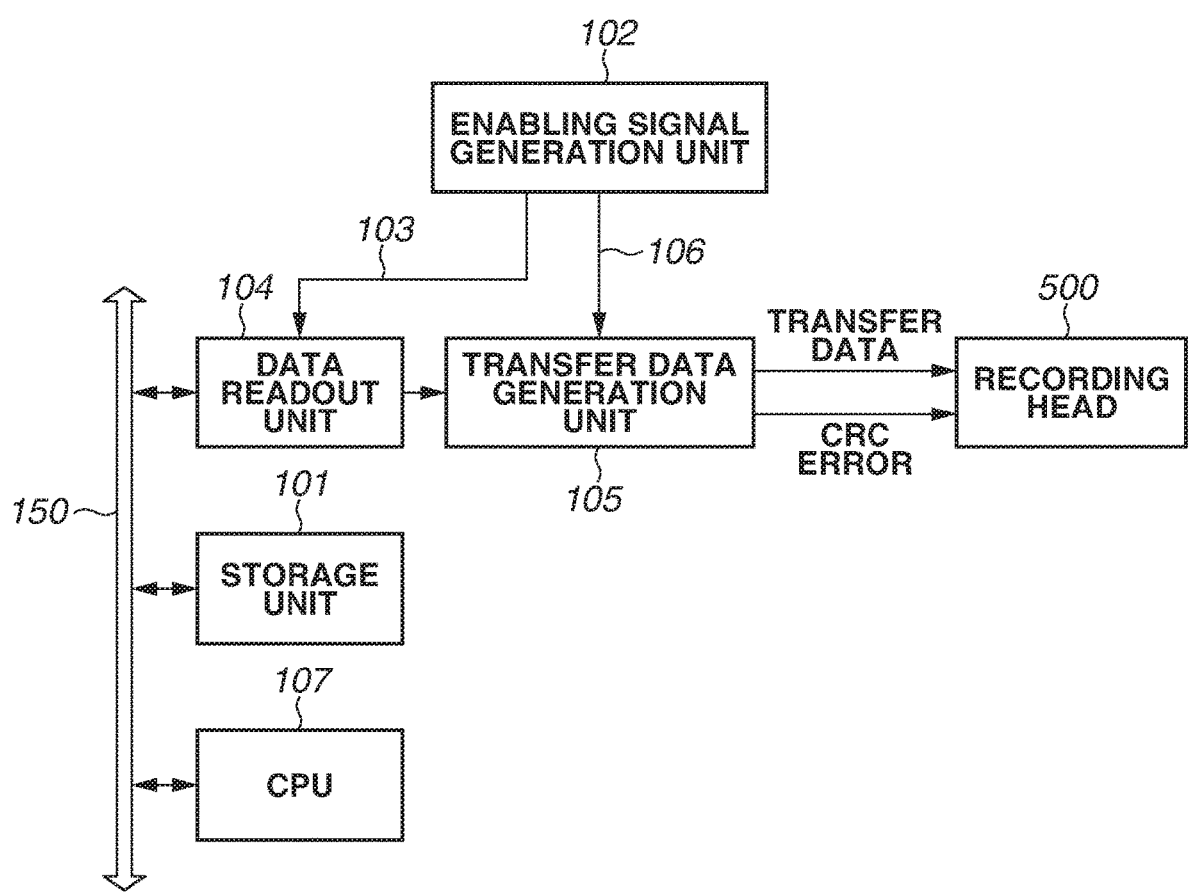
FIG. 1 is a block diagram illustrating a configuration of an inkjet recording apparatus serving as a recording apparatus according to an exemplary embodiment of the present invention.

Various exemplary embodiments, features, and aspects of the present invention will be described below with reference to the drawings. In the following description, a case in which a recording apparatus according to exemplary embodiments of the present invention is an inkjet recording apparatus which performs recording that is based on recording data on a recording medium by ejecting ink is described. However, a recording apparatus to which the present invention is applied is not limited to an inkjet recording apparatus but can be any type of apparatus as long as it includes a recording head and is capable of recording, for example, an image on a recording medium such as paper. FIG. 1 illustrates the overall circuit configuration of an inkjet recording apparatus serving as a recording apparatus according to an exemplary embodiment of the present invention, and FIG. 2 illustrates an outline configuration of a recording unit of the inkjet recording apparatus.

Figure 2:
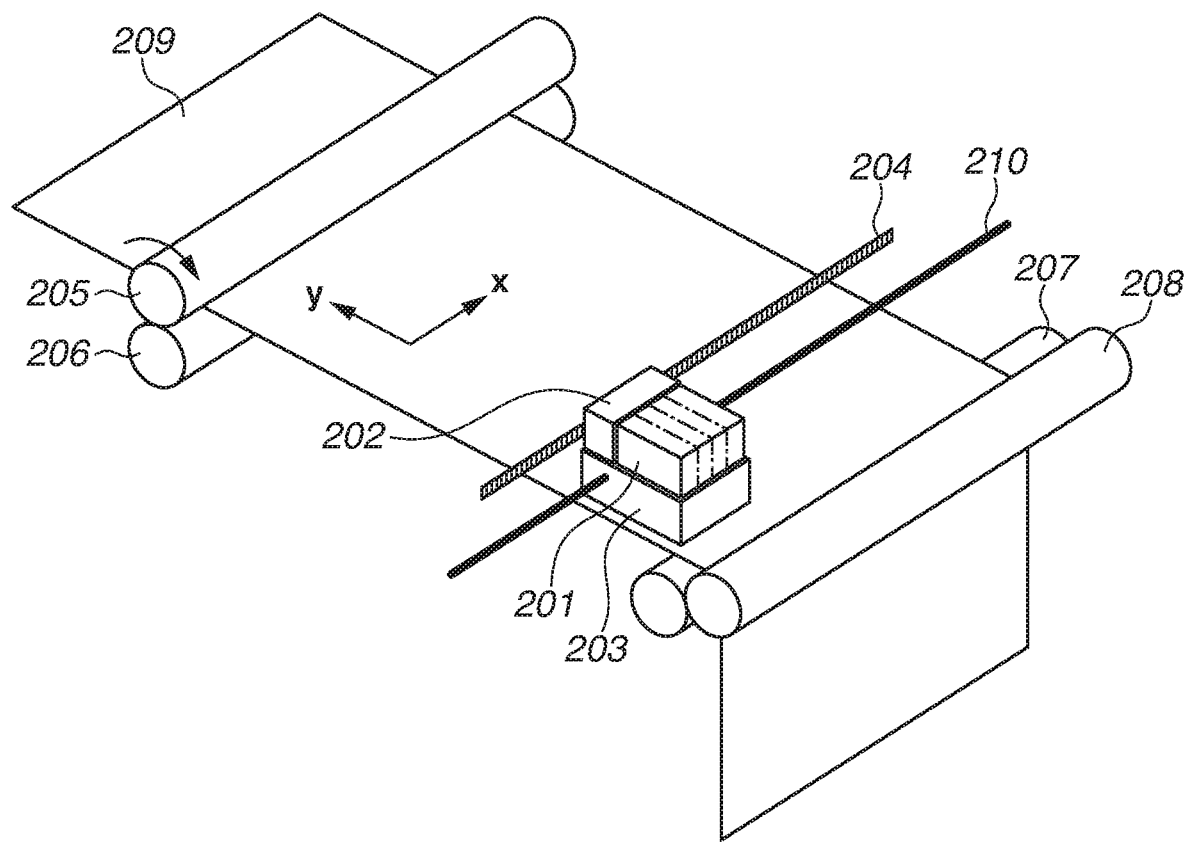
FIG. 2 is a perspective view illustrating an outline configuration of a recording unit of the inkjet recording apparatus.

As illustrated in FIG. 2, the inkjet recording apparatus is an apparatus which performs recording of, for example, an image on a recording medium 209, which is supplied in the form of, for example, a continuous sheet. The recording medium 209 is fed while being pinched by a pair of feed rollers 207 and 208 and is also pinched by a conveyance roller 205 and an auxiliary roller 206 to be conveyed in the direction y illustrated in FIG. 2 by the conveyance roller 205 being rotated in the direction of an arrow illustrated in FIG. 2. A guide shaft 210, which extends in parallel with the surface of the recording medium 209 and in the direction x illustrated in FIG. 2, is provided above the surface of the recording medium 209. A carriage 203 engages with the guide shaft 210 in such a way as to be able to slide, so that the carriage 203 is able to move along the guide shaft 210. Moreover, an encoder scale 204 is provided in parallel with the guide shaft 210 and in such a way as to face the carriage 203. The encoder scale 204 includes slits provided at a density of 150 slits per 25.4 mm. The encoder scale 204 is irradiated with light emitted from an encoder sensor (not illustrated), and the carriage 203 detects light passing through slits of the encoder scale 204. The carriage 203 outputs signals of phase A and phase B that are based on light passing through slits of the encoder scale 204, according to the scanning position, in other words, the position in the direction x, of the carriage 203. Here, the phase B signal is in a phase relationship which is delayed by 90 degrees from the phase A signal. Counting the signals of phase A and phase B enables detecting an accurate scanning position of the carriage 203.

A head cartridge 202 and an ink cartridge 201, which are included in a recording head configured in a cartridge form, are mounted on the carriage 203 in such a way as to be independently detachably attached to the carriage 203. The ink cartridge 201 is a cartridge which individually retains and reserves four color inks of black (Bk), cyan (C), magenta (M), and yellow (Y) therein and which is configured with respective color ink reservoir chambers integrally formed. The head cartridge 202 includes two recording element arrays per color, a total of eight recording element arrays, corresponding to four color inks reserved in the ink cartridge 201. The cartridge 202 is configured such that such eight recording element arrays form a single unit. Each recording element array includes, for example, 384 discharge ports arranged in a row in the direction y illustrated in FIG. 2, and a recording element, which generates energy for ejecting ink from a corresponding discharge port, is provided for each discharge port. The number of discharge ports provided for one recording element array is not limited to 384 but can be a number increased or decreased as appropriate. Respective color inks are ejected from discharge ports of the recording element arrays according to recording data, which is described below, so that recording of, for example, an image or characters is performed on the recording medium 209.

A circuit configuration of the inkjet recording apparatus including a recording unit such as that illustrated in FIG. 2 is illustrated in FIG. 1. In a body portion of the inkjet recording apparatus, a storage unit 101, a data readout unit 104, and a central processing unit (CPU) 107 are connected to an internal bus 150, and, moreover, an enabling signal generation unit 102 and a transfer data generation unit 105 are provided. The storage unit 101 is a unit which stores recording data corresponding to two recording element arrays for each color of ink which is ejected from a recording head 500. The format of recording data is described below. The enabling signal generation unit 102 identifies the scanning position of the carriage 203 based on signals of phase A and phase B input from the above-mentioned encoder sensor. Then, the enabling signal generation unit 102 outputs a readout enabling signal 103 and a transfer enabling signal 106 to the data readout unit 104 and the transfer data generation unit 105, respectively, according to the identified scanning position. The data readout unit 104 performs readout of recording data from the storage unit 101 while using the readout enabling signal 103 output from the enabling signal generation unit 102 as a timing signal for readout, and transmits the read-out recording data to the transfer data generation unit 105. The enabling signal generation unit 102, the data readout unit 104, and the transfer data generation unit 105 constitute a controller which converts recording data and control data for controlling the recording head 500 into transfer data in respective command formats and then transmits the transfer data to the recording head 500.

The transfer data generation unit 105 converts the following four pieces of data or signals into data formats in command formats to drive the recording head 500:

(1) recording data received from the data readout unit 104;

(2) control data for defining, for example, the waveform of a drive signal which is applied to a recording element for ejecting ink;
(3) control data for turning on and off a heating element (hereinafter referred to as a "sub-heater"), which is located inside a discharge port of the recording head 500 and heats ink; and
(4) cyclic redundancy check (CRC) data for data which is transmitted to the recording head 500.

The transfer data generation unit 105 transfers the data converted into command formats as transfer data to the recording head 500 while using the transfer enabling signal 106 output from the enabling signal generation unit 102 as a timing signal. At this time, during a period from receipt of recording data from the data readout unit 104 to receipt of the transfer enabling signal 106, the transfer data generation unit 105 temporarily stores the transfer data converted into command formats in a buffer (not illustrated) provided therein. The transfer data generation unit 105 further receives a CRC error signal from the recording head 500. Processing to be performed when a CRC error has occurred is described below. The CPU 107 is a unit which controls the overall operation of the inkjet recording apparatus described in the present exemplary embodiment, and, in particular, has the function of performing various settings on the enabling signal generation unit 102, the data readout unit 104, and the transfer data generation unit 105.

Figure 3:
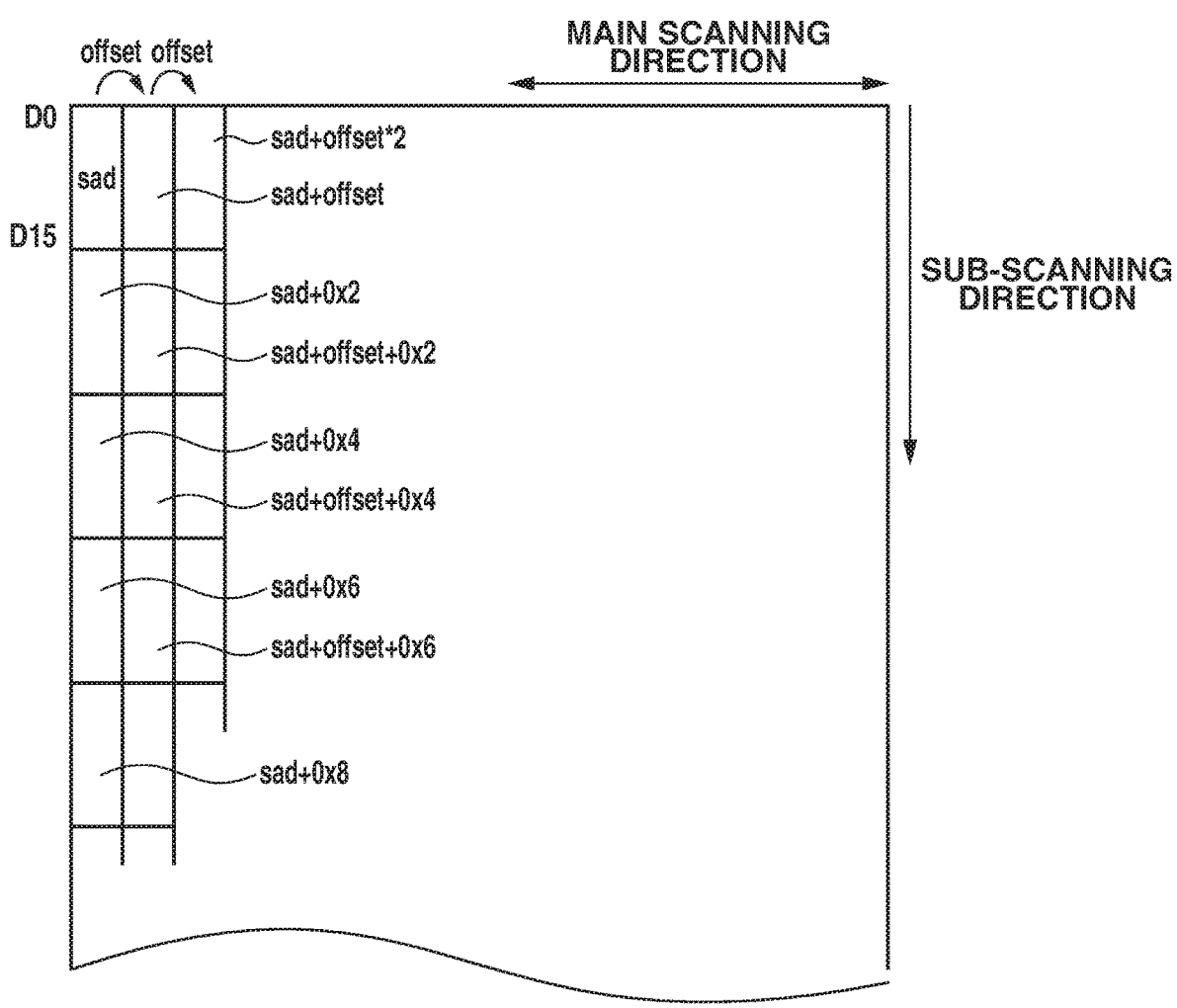
FIG. 3 is a diagram illustrating a storage format of recording data in a storage unit.

FIG. 3 illustrates an example of a storage format of recording data in the storage unit 101. Here, as an image on a recording medium, such as paper, on which recording is performed by ejecting ink based on recording data, a storage format of recording data concerning one recording element array about a given color is illustrated. Here, the main scanning direction is a direction along which the recording head 500 is moved backwards and forwards by the carriage 203, in other words, the direction x illustrated in FIG. 2. The sub-scanning direction is the conveyance direction of the recording medium 209, in other words, the direction y illustrated in FIG. 2, and a plurality of discharge ports constituting a recording element array is arranged along the sub-scanning direction. In this storage format, recording data which is recorded in an upper left portion of the recording medium is stored as 16-bit data having bit D0 to bit D15 at an address "sad", and is stored at consecutive addresses with respect to the sub-scanning direction. Furthermore, "sad" is any given variable indicating an address in the storage unit 101. Recording data next to the leftmost column by n columns is stored in a region away from "sad" by "n*offset" ("offset" being any given variable). With regard to other recording element arrays, recording data is stored in the same format in the respective different regions.

Figure 4:
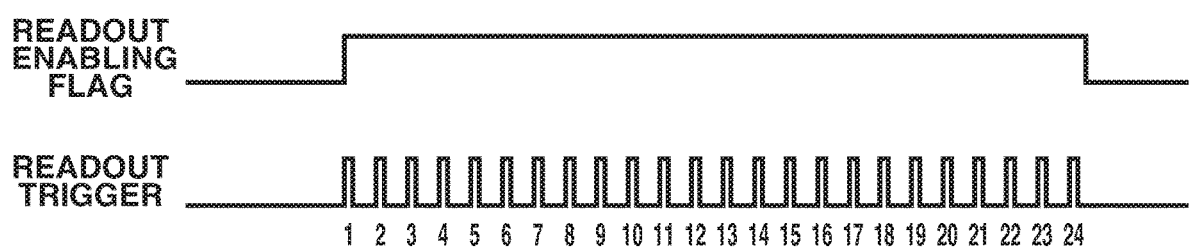
FIG. 4 is a timing chart illustrating a readout enabling signal.

FIG. 4 illustrates the details of the readout enabling signal 103. The readout enabling signal 103 is configured with a readout enabling flag and a readout trigger, and a pair of the readout enabling flag and the readout trigger is provided for each recording element array. The readout trigger is a pulse signal which defines actual readout timing. In an example illustrated here, each of the readout enabling flag and the readout trigger is a signal which takes any one of binary levels of "H" and "L" and which indicates an enabled state when being at "H" level. When determining that the carriage 203 has arrived at a predetermined scanning position based on a signal input from the above-mentioned encoder sensor, the enabling signal generation unit 102 transitions the readout enabling flag to "H" level indicating an enabled state. Moreover, the enabling signal generation unit 102 also transitions the readout trigger to "H" level indicating an enabled state with a period at which to record one column of recording data stored in the storage unit 101 on a recording medium.

When the output of the readout trigger becomes at "H" level while the readout enabling flag is at "H" level, the data readout unit 104 performs readout of recording data for one column from inside the storage unit 101, and then transmits the read-out recording data to the transfer data generation unit 105. The details of this readout are described below. Upon receiving the recording data, the transfer data generation unit 105 converts the recording data, together with control data for defining the waveform of a drive signal, into data formats in command formats, and then stores the commands in a buffer provided therein. When the output of the readout trigger becomes at "H" level again, the above-described processing is performed in the same manner with respect to recording data next to the column subjected to the previous readout.

In the present exemplary embodiment, specifically, recording data for one column, which is read out by one cycle of readout processing, is data located within a range corresponding to the number of discharge ports of the recording element array in a region in which recording data for a predetermined column is stored in the storage unit 101. For example, consider a case where the number of discharge ports per one recording element array is 384 and recording is started with the upper left position on the recording medium. First, when the output of the readout trigger becomes at "H" level while the readout enabling flag is at "H" level, the data readout unit 104 consecutively reads out recording data of 384 bits in total from a region at address "sad" to address "sad+0x2E" of the storage unit 101. When the output of the readout trigger becomes at "H" level again, the data readout unit 104 consecutively reads out recording data from a region at address "sad+offset" to address "sad+offset+0x2E", which corresponds to a column next to the earlier column, in the storage unit 101. After that, each time the output of the readout trigger becomes at "H" level, the data readout unit 104 sequentially reads out recording data in a region corresponding to addresses incremented by "offset" from the storage unit 101. In the example illustrated in FIG. 4, since, during a period when the readout enabling flag is at "H" level, the readout trigger becomes at "H" level 24 times, this means that readout of recording data for 24 columns has been performed. Setting of how many times to cause the readout trigger to become at "H" level while the readout enabling flag is at "H" level is performed on the enabling signal generation unit 102 by the CPU 107.

Figure 5:
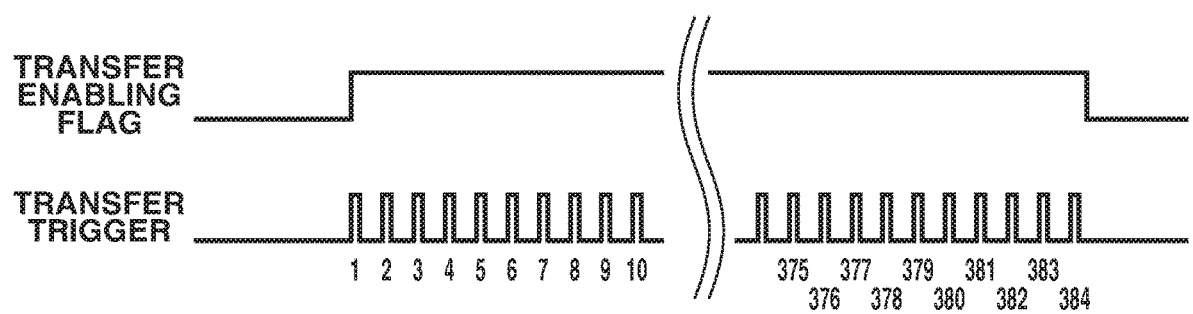
FIG. 5 is a timing chart illustrating a transfer enabling signal.

FIG. 5 illustrates the details of the transfer enabling signal 106. The transfer enabling signal 106 is a signal which is set for every recording element array, and is configured with a transfer enabling flag and a transfer trigger. As in the case of the readout enabling signal 103, the enabling signal generation unit 102 outputs the transfer enabling flag and the transfer trigger based on the scanning position of the carriage 203. When the output of the transfer trigger becomes at "H" level indicating an enabled state while the transfer enabling flag is at "H" level indicating an enabled state, the transfer data generation unit 105 reads out predetermined data in command formats from the buffer provided therein, and then transmits the read-out predetermined data as transfer data to the recording head 500.

As with FIG. 4, FIG. 5 illustrates waveforms output when recording data for 24 columns is transferred to the recording head 500. In FIG. 5, during a period when the transfer enabling flag is at "H" level, the transfer trigger, which is a pulse signal, becomes at "H" level 384 times. This is because, in each recording element array of the recording head 500, recording data for one column is divided into 16 pieces in a time-sharing manner to be recorded. Since the inkjet recording apparatus being equipped with a power source which enables concurrently ejecting ink from all of the discharge ports is not favorable in terms of an increase in cost of the apparatus or the possible occurrence of noise caused by the flow of large current, time-sharing recording is performed in the present exemplary embodiment. The detailed method of performing recording while dividing recording data for one column into 16 pieces in a time-sharing manner is as follows. The method divides a plurality of recording elements constituting each recording element array into 16 groups each of which includes 24 elements (in the present exemplary embodiment, 384 elements divided by 16 pieces in time sharing being equal to 24 elements), and recording elements included in each group are allocated to 16 blocks in total from "0" to "15". Then, the method sequentially drives the recording elements of each block at points of timing obtained by dividing a time required for printing data for one column into 16 points of time in a time-sharing manner, thus finally driving all of the recording elements according to recording data.

FIG. 6 illustrates an example of transfer data which is generated by the transfer data generation unit 105 and is then transmitted to the recording head 500. Each command able to be included in the transfer data has a format such as that illustrated in FIG. 7 and is a command of one-byte length to five-byte length. In FIG. 6, data with a double circle placed on the head thereof is data serving as the first byte of a command. Data at the first byte of each command is used to identify what command the present command is. While only a start command is configured with one command and, therefore, does not have the second and subsequent bytes, the other commands have the second and subsequent bytes in which data accompanying the command is stored. In the transfer data illustrated in FIG. 6, a start command is located at the head to indicate the start of transfer, and, subsequently, after pieces of recording data in the respective recording element arrays, drive timing signals for the recording head 500, and control signals for the sub-heater are sequentially transferred, CRC data is transferred. These pieces of data are all in command formats, and are required to be transferred during a period from when the transfer trigger (FIG. 5) becomes at "H" level to when the transfer trigger next becomes at "H" level.

The content of data in each command is described as follows with reference to FIG. 7. In FIG. 7, a bit denoted by "x" represents a "don't care" bit, in other words, a bit which can be either "0" or "1". In the present exemplary embodiment, since there are eight recording element arrays, the first byte of the recording data command is also provided with eight types of commands to select the respective recording element arrays. For example, "recording data Bk0" and "recording data Bk1" are provided to select two recording element arrays corresponding to ink of black (Bk). Commands are also similarly provided with respect to recording element arrays in which two recording element arrays are provided for each of the other colors, cyan (C), magenta (M), and yellow (Y). In a case where the number of recording element arrays provided in the recording head 500 is larger, additional recording data commands can be set in such a manner that each recording element array becomes exclusive. The second byte indicates data of which block in 16 blocks is transferred. In FIG. 6, the second byte of the recording data command is written as "data length/BLK Num". The third to fifth bytes of the recording data command are a recording data body, in which, with respect to 24 elements belonging to the block designated by the second byte, performing or not performing recording (in other words, ink ejection) is indicated by "0" or "1".

Figure 8:
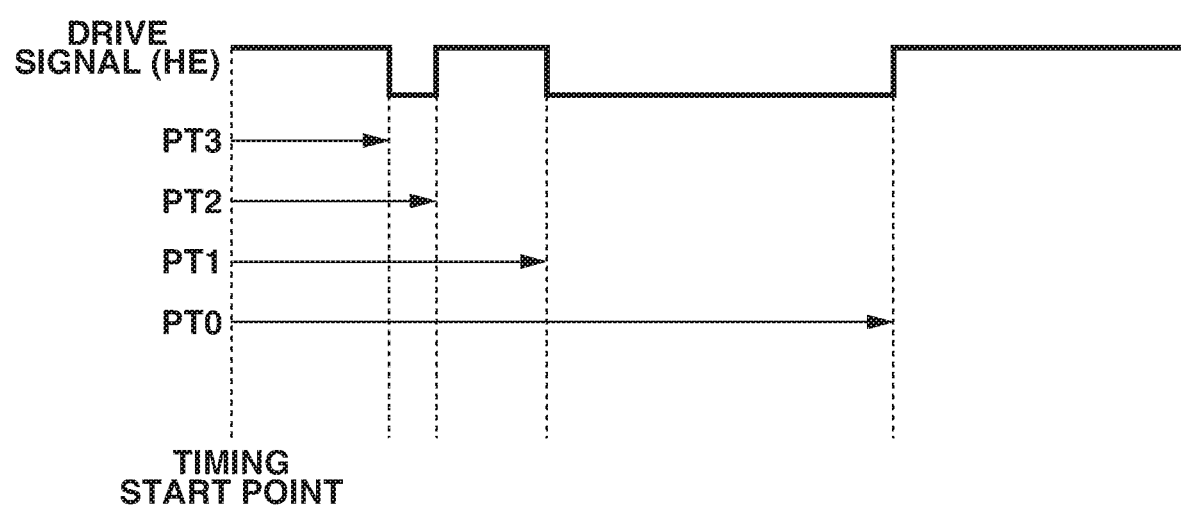
FIG. 8 is a timing chart illustrating a relationship between a drive signal and parameters PT0 to PT3.
Figure 9:
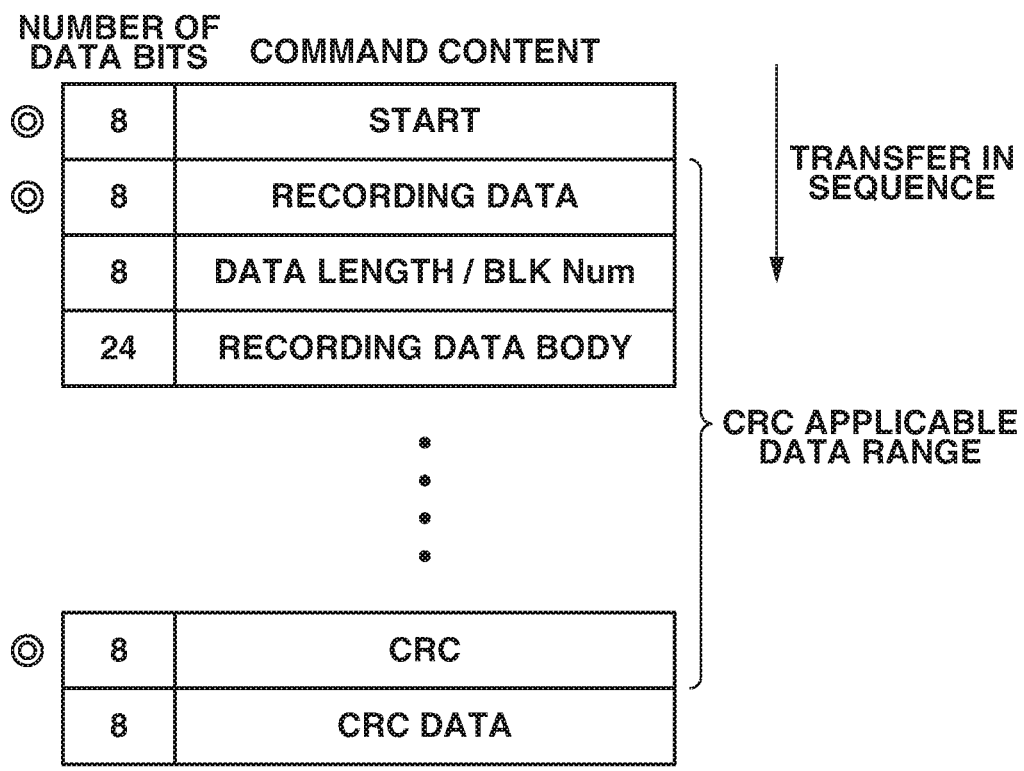
FIG. 9 is a diagram illustrating a range targeted for cyclic redundancy checking (CRC) inspection inside the transfer data.

An HE timing command is a command for transferring a drive timing signal for the recording head 500. The drive timing signal is a signal for defining the waveform or timing of a drive signal (HE) to drive each recording element in the recording head 500. For example, in a case where a heating element is used as a recording element, the drive signal (HE) is a signal which, when being at "L" level, causes a voltage to be applied to the heating element, and is a signal which is applied to a base or gate of a transistor provided in series with the heating element. In the example illustrated in the present exemplary embodiment, changing points of the drive signal (HE) are defined as illustrated in FIG. 8, and times from the timing start point to the respective changing points are set by parameters PT0 to PT3. At the first byte of the HE timing command, any one of the parameters PT0 to PT3 is selected, and the second byte thereof represents timing data about the selected parameter. The timing data is expressed by the number of cycles in a period from the timing start point to a corresponding changing point illustrated in FIG. 8. The sub-heater command is a command for transferring a signal which controls turning on and off of the sub-heater. Turning on and off of the sub-heater is controlled according to whether the least significant bit D0 of the second byte is "0" or "1". In a case where the recording head 500 is provided with sub-heaters for a plurality of channels, to control turning on and off of each channel, any one of bits D7 to D1 of the second byte of the sub-heater command is allocated to each channel to control the sub-heater of the corresponding channel. In the CRC command, data obtained by CRC calculation is stored as CRC detection data at the second byte. In the present exemplary embodiment, as illustrated in FIG. 9, a command next to the start command to the first byte of the CRC command are assumed to be a range targeted for CRC inspection. The CRC command is transferred at the end of a series of commands because of its nature.

Figure 10:
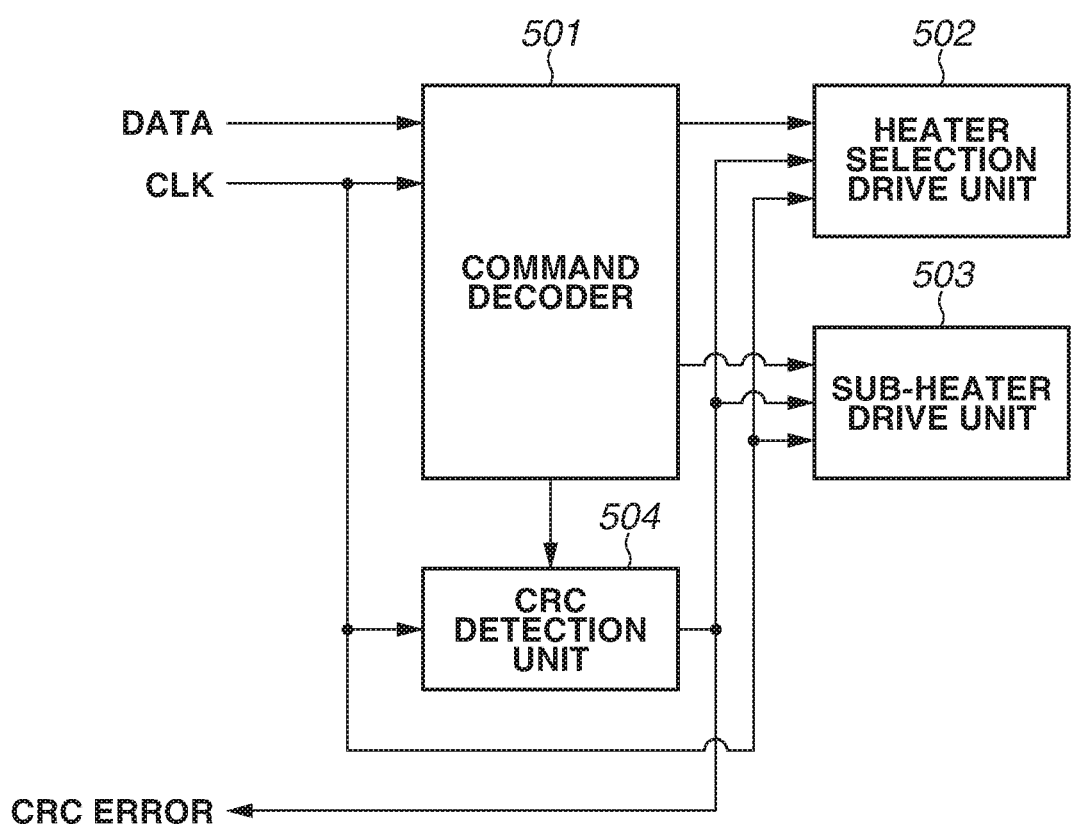
FIG. 10 is a block diagram illustrating a configuration of a data receiving unit of the recording head.

FIG. 10 illustrates a configuration of a data receiving unit which, in the recording head 500, receives transfer data transmitted from the transfer data generation unit 105. The transfer data generation unit 105, which is provided at the body side of the inkjet recording apparatus, and the data receiving unit of the recording head 500 are interconnected via a transmission path such as a serial bus. The transfer data is transmitted in the form of a data signal DATA synchronized with a clock signal CLK. The data receiving unit is configured with a command decoder 501, a heater selection drive unit 502, a sub-heater drive unit 503, and a CRC detection unit 504. The command decoder 501 receives the clock signal CLK and the data signal DATA, which is a substance of the transfer data, and decodes data of the first byte of each command to identify which command the received command is. Upon identifying the command, the command decoder 501 transfers data of the second byte to the fifth byte of the identified command to one of the heater selection drive unit 502, the sub-heater drive unit 503, and the CRC detection unit 504 according to the type of the identified command. The clock signal CLK is also supplied to the heater selection drive unit 502, the sub-heater drive unit 503, and the CRC detection unit 504 for the purpose of synchronization.

The heater selection drive unit 502 selects a recording element to be driven based on recording data included in the data transferred from the command decoder 501 and drives the selected recording element based on the drive signal (RE) to cause ink to be ejected from a discharge port corresponding to the selected recording element. Moreover, in a case where data about the parameters PT0 to PT3 included in the HE timing commands has been transferred, the heater selection drive unit 502 performs control to vary the waveform of the drive signal (HE). The sub-heater drive unit 503 performs control to turn on or off the sub-heater based on data of the second byte of the sub-heater command. The CRC detection unit 504, which is an error detection unit, performs a CRC calculation on the data received by the data receiving unit and determines whether CRC detection data calculated from the actually received data matches CRC detection data included in the transfer data. If the CRC detection data calculated from the actually received data and the CRC detection data included in the transfer data do not match each other, the CRC detection unit 504 outputs a CRC error signal indicating the occurrence of a transmission error. The CRC error signal is transmitted to the transfer data generation unit 105, the heater selection drive unit 502, and the sub-heater drive unit 503. In one example, upon receiving the CRC error signal, the heater selection drive unit 502 and the sub-heater drive unit 503 determine that there is an error in the data received by the recording head 500 and respectively bring a drive signal for performing ejection control of ink and a drive signal for driving the sub-heater into a non-driving state. The non-driving state continues until normal transfer data, in other words, transfer data containing no error, is received. The non-driving state continuing eventually leads to stopping of recording on a recording medium.

FIG. 6 described above illustrates an example of data which is transferred to the recording head 500. However, here, considering the case of performing high-speed recording, an interval between pulses of the transfer trigger illustrated in FIG. 5, in other words, a time interval between a pulse in the trigger and a next pulse therein, shortens. Therefore, it becomes difficult to transmit transfer data having such a length as illustrated in FIG. 6 to the recording head 500, so that the number of commands which can be included in the transfer data would become restricted. Among commands included in the transfer data, a start command and a recording data command cannot be omitted. It is also difficult to omit a CRC command, for the purpose of error detection. On the other hand, among data included in the HE timing commands, parameters PT0 and PT3 are ones which are not required to be changed when recording is actually being performed. Moreover, parameters PT1 and PT2 may be increased or decreased according to the temperature of the recording head 500 or the number of recording elements which are concurrently driven, but are not ones which are not necessarily required to be transmitted each time data transfer is performed. In other words, it is not necessary to transmit all of a series of pieces of HE timing data for every data transfer. Since, while the sub-heater is turned on and off to perform control of the temperature of ink, the temperature of ink does not change rapidly, for the same reason, it is not necessary to transmit the sub-heater command each time for every data transfer.

Figure 12:
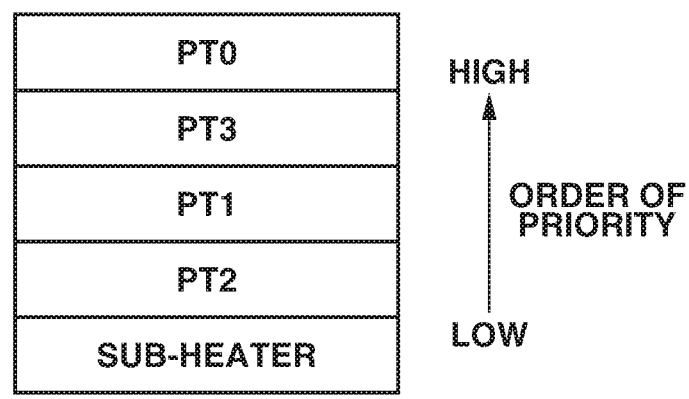
FIG. 12 is a diagram illustrating the order of priority of data to be transferred.

Accordingly, a group of commands illustrated in FIG. 7 can be classified into commands which are necessarily transmitted each time (the start command, the recording data command, and the CRC command) and commands which are not necessarily transmitted each time (the HE timing command and the sub-heater command). Therefore, in the present exemplary embodiment, in a case where the interval in the transfer trigger (FIG. 5) is short, according to this interval, as illustrated in FIG. 11, only one of commands which are required to be updated at that point in time is selected from among the commands which are not necessarily transmitted each time, so that the length of the transfer data is shortened. As a result, the transfer data illustrated in FIG. 11 becomes shorter by 8 bytes (64 bits) than the transfer data illustrated in FIG. 6, so that it becomes easy that the transfer data falls within the length of a period between two pulses (a period between "H" level and next "H" of the transfer trigger (FIG. 5). Furthermore, a case where it is necessary to transfer the HE timing command and the sub-heater command at the same timing may occur. In such a case, control is performed such that a command to be transferred is determined according to the order of priority indicated by a table illustrated in FIG. 12 and a command lower in order of priority is transferred at the time of next data transfer.

In the present exemplary embodiment, the commands which are not necessarily transmitted each time are included in the transfer data and transmitted to the recording head 500 only when the need for updating arises. In this case, a command may not be correctly received by the recording head 500 due to a transmission error. While whether the command has been correctly received can be ascertained by CRC inspection, in a case where the command has not been correctly received, the recording head 500 remains in a state which has been set by a command correctly received before that. A configuration can be considered in which, if an error has occurred, the transfer data generation unit 105, which has received a signal containing a CRC error, retransmits transfer data in which an error has occurred as it stands. On the other hand, a configuration can also be considered in which, when it is assumed to be ignored that recording data may have an error occurring, the transfer data generation unit 105 transmits next transfer data. In a configuration in which, even if there is an error, the transfer data generation unit 105 transmits next transfer data, for example, with regard to the HE timing data, a situation in which, although should be originally updated, the HE timing data remains not updated at the side of the recording head 500 occurs. If the waveform of the drive signal (HE) defined by the HE timing command remains not updated, a recording element would be driven by an inappropriate drive signal, so that stress is imparted to the recording head 500. This situation being prolonged leads to the occurrence of a malfunction in the recording head 500.

Therefore, in the present exemplary embodiment, even in a case where retransmission of a recording data command is not performed at the time of error occurrence, transfer data is reconstructed in such a manner that a command which is other than a recording data command and which is scheduled not to be included in transfer data is included in the transfer data again and the reconstructed transfer data is transmitted. Such processing for reconstructing transfer data is performed by the transfer data generation unit 105. FIGS. 13A, 13B, 13C, and 13D illustrate transfer commands which the transfer data generation unit 105 generates in a case where a signal indicating a CRC error has been transmitted from the recording head 500 to the transfer data generation unit 105. A command concerning the parameter PT1 in the HE timing commands is not required to be transferred each time at the normal time, but, as illustrated in FIG. 13A, is assumed to have been transmitted to the recording head 500 in the n-th transfer data. In a case where, with respect to the n-th transfer data, an error has not been detected at the side of the recording head 500, as illustrated in FIG. 13B, the transfer data generation unit 105 causes the sub-heater command to be included in the next, (n+1)-th, transfer data. On the other hand, in a case where a CRC error signal has been received with respect to the n-th transfer data, as illustrated in FIG. 13C, the transfer data generation unit 105 causes a command concerning the parameter PT1 instead of the sub-heater command to be included in the (n+1)-th transfer data based on the order of priority illustrated in FIG. 12. The sub-heater command, which has not been included in the transfer data here, is transmitted to the recording head 500 in the (n+2)-th transfer data, as illustrated in FIG. 13D. In this way, when a CRC error has been detected, a command concerning the parameter PT1 is retransmitted, so that an opportunity of updating of the parameter PT1 becomes not impaired, and unwanted stress is prevented from being imparted to the recording head 500.

In the processing described here, in a case where a CRC error has continuously occurred, the transfer data generation unit 105 would continue retransmitting a command concerning the parameter PT1 until data transfer becomes successful. However, in a case where a CRC error has been continuously received three or more times, the transfer data generation unit 105 determines that there is a steady problem in a transmission path such as a serial bus, and then stops data transfer and notifies the CPU 107 of that effect. As a result, the inkjet recording apparatus eventually stops a recording operation itself.

Figure 14:
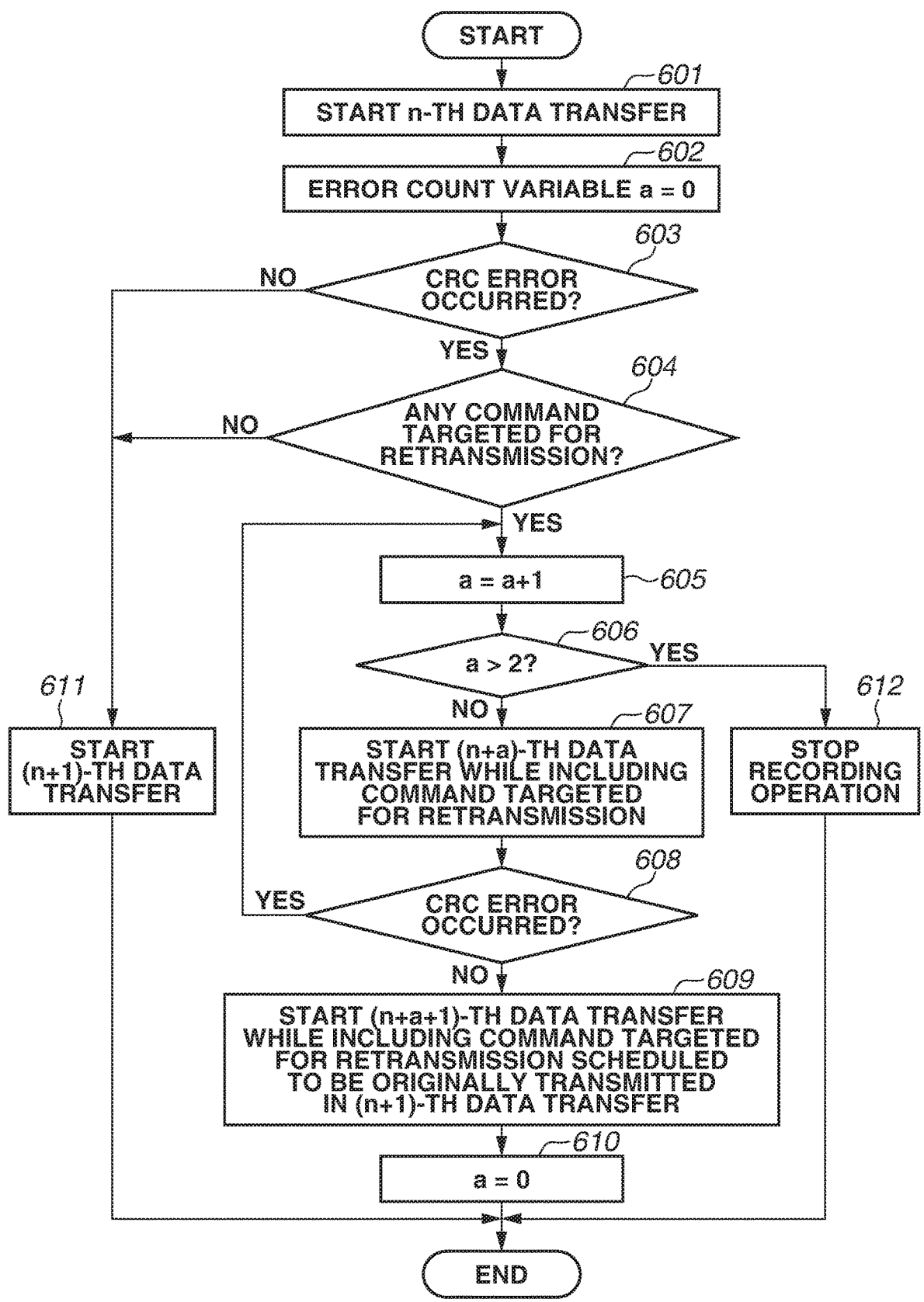
FIG. 14 is a flowchart illustrating processing for changing commands to be transferred.

FIG. 14 illustrates, as a flowchart, the processing described with reference to FIGS. 13A to 13D, which is performed by the transfer data generation unit 105, with the n-th data transfer taken as an example. In step 601, the transfer data generation unit 105 starts the n-th data transfer, and, in step 602, the transfer data generation unit 105 assigns "0" to a variable "a" for counting the number of times of a CRC error. Next, in step 603, the transfer data generation unit 105 determines whether a CRC error has occurred in the n-th data transfer. If it is determined that a CRC error has not occurred (NO in step 603), the processing proceeds to step 611, in which the transfer data generation unit 105 performs the (n+1)-th data transfer and ends the processing concerning the n-th data transfer. On the other hand, if, in step 603, it is determined that a CRC error has occurred (YES in step 603), then in step 604, the transfer data generation unit 105 determines whether a command targeted for retransmission has been included in the nth data transfer. The command targeted for retransmission is, for example, each of the HE timing commands and the sub-heater command. If it is determined that a command targeted for retransmission has not been included (NO in step 604), the processing proceeds to step 611, in which the transfer data generation unit 105 performs the (n+1)-th data transfer and ends the processing concerning the nth data transfer. If, in step 604, it is determined that a command targeted for retransmission has been included (YES in step 604), the processing proceeds to step 605.

In step 605, the transfer data generation unit 105 adds "1" to the variable "a" for error counting, and, in step 606, the transfer data generation unit 105 determines whether the variable "a" is larger than "2". If it is determined that the variable "a" is larger than "2" (YES in step 606), the transfer data generation unit 105 determines that there is a steady problem in a transmission path, and the processing proceeds to step 612, in which the transfer data generation unit 105 stops data transfer and eventually stops a recording operation itself, thus ending a series of processing operations. On the other hand, if, in step 606, it is determined that the variable "a" is equal to or less than "2" (NO in step 606), the processing proceeds to step 607, in which the transfer data generation unit 105 starts the (n+a)-th data transfer while including a command transferred in the nth data transfer and targeted for retransmission, and the processing then proceeds to step 608. In step 608, the transfer data generation unit 105 determines whether a CRC error has occurred in the (n+a)-th data transfer, and, if it is determined that a CRC error has occurred (YES in step 608), the processing returns to step 605, in which the transfer data generation unit 105 repeats processing in step 605 and subsequent steps. If, in step 608, it is determined that a CRC error has not occurred (NO in step 608), the processing proceeds to step 609. In step 609, the transfer data generation unit 105 starts the (n+a+1)-th data transfer while including a command targeted for retransmission scheduled to be originally transmitted in the (n+1)-th data transfer, and the processing then proceeds to step 610. In step 610, the transfer data generation unit 105 assigns "0" to the variable "a", and then ends the processing concerning the n-th data transfer.

While the flowchart illustrated in FIG. 14 is concerned with the n-th transfer operation with regard to transfer data, the (n+1)-th, (n+2)-th, . . . , transfer operations can also be performed in a similar way. For example, the start of the (n+1)-th data transfer in step 611 illustrated in FIG. 14 is processing equivalent to step 601 performed in a case where a similar processing operation is performed with respect to the (n+1)-th data transfer, and, in the (n+1)-th data transfer, after that, step 602 and subsequent steps are performed.

While, in the above-described exemplary embodiment, a command next to the start command to the first byte of the CRC command are set as a CRC applicable data range, it is also possible to assume that any erroneous recording data stops short of imparting unwanted stress to the recording head. In such an assumption, the CRC detection unit 504 can detect an error about a recording data command and an error about a command other than the recording data command while distinguishing between them. Specifically, as illustrated in FIG. 15, only the HE timing command, the sub-heater command, and the first byte of the CRC command can be set as a CRC applicable data range. In a case where a CRC applicable data range is set as illustrated in FIG. 15, the need for retransmission of a command in a case where there is no possibility of imparting stress to the recording head 500 can be eliminated. At that time, since, even if there is an error in a recording data command, the error is not detected, the transmission of transfer data continues as it stands, and a recording operation of the inkjet recording apparatus also continues. In a case where an error in a command other than the recording data command has been detected, for example, a drive signal and a signal for driving the sub-heater are brought into a non-driving state until normal transfer data is received. Moreover, in this case, even if a CRC error occurs due to an error present in data about the sub-heater command, it is also possible to assume that this error stops short of immediately causing a malfunction of the recording head. Therefore, in the case of a data error in a sub-heater command even among commands concerning control data, a configuration in which an option of not bringing a drive signal and a signal for driving the sub-heater into a non-driving state is possible can be employed. For example, this option is previously set to the transfer data generation unit 105 by the CPU 107 according to an input from the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

According to the above-described exemplary embodiment, even in a case where old data or erroneous data has been stored in a recording head as a result of the occurrence of an error in transfer data to the recording head, such data is updated with next transfer data, so that such a situation that a malfunction occurs in the recording head due to an error in transfer data can be avoided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-192648, filed Oct. 2, 2017, which is hereby incorporated by reference herein in its entirety.

What is claimed is:

1. A recording apparatus comprising:
a recording head including a plurality of recording elements and which performs recording based on recording data on a recording medium by driving the plurality of recording elements; and
a controller connected to the recording head via a transmission path and configured to convert each of the recording data and control data for controlling the recording head into transfer data in a command format and to transmit the transfer data to the recording head,
wherein the recording head includes an error detection unit configured to detect a transmission error of the transfer data received by the recording head and to transmit a signal indicating detection of the error to the controller,
wherein, in a case where the controller receives the signal indicating detection of the error, the controller determines whether a predetermined command concerning the control data which is not scheduled to be included in next transfer data is included in data of the transmission error, and in a case where the predetermined command is included in the data of the transmission error, the controller reconstructs the next transfer data to be transmitted to the recording head so as to cause the predetermined command to be included in the next transfer data, and then transmits the next transfer data reconstructed.

2. The recording apparatus according to claim 1, wherein, in a case where there is a restriction in number of commands which are able to be included in the transfer data, the controller performs selection about commands concerning the control data based on a predetermined order of priority, and causes a selected command to be included in the transfer data.

3. The recording apparatus according to claim 1, wherein, in a case where an error has been detected by the error detection unit, the recording apparatus stops recording on the recording medium until normal transfer data corresponding to the transfer data is received.

4. The recording apparatus according to claim 1, wherein the error detection unit detects an error about a command concerning the recording data and an error about a command other than the command concerning the recording data while distinguishing between them.

5. The recording apparatus according to claim 4, wherein, in a case where an error detected by the error detection unit is an error about a command other than the command concerning the recording data, the recording apparatus stops recording on the recording medium until normal transfer data is received.

6. The recording apparatus according to claim 4, wherein, in a case where an error detected by the error detection unit is an error about a command other than the command concerning the recording data, the recording apparatus has an option of stopping recording on the recording medium or continuing a recording operation until normal transfer data is received.

7. The recording apparatus according to claim 1, wherein the recording apparatus is an inkjet recording apparatus, and a command concerning the control data includes a command defining a waveform for driving each of the recording elements.

8. The recording apparatus according to claim 1, wherein in a case where the controller receives the signal indicating detection of the error, the controller determines whether the predetermined command concerning the control data which is not scheduled to be included in the next transfer data is included in the data of the transmission error, and in a case where the predetermined command is not included in the data of the transmission error, the controller transmits the next transfer data without reconstruction.

9. A control method for a recording apparatus which includes a recording head including a plurality of recording elements and which performs recording based on recording data on a recording medium by driving the plurality of recording elements, the control method comprising:
a transmission process of converting each of the recording data and control data for controlling the recording head into transfer data in a command format and transmitting the transfer data to the recording head via a transmission path; and
a process of detecting, in the recording head, an error in the received transfer data,
wherein the transmission process after detecting the error includes determining whether a predetermined command concerning the control data which is not scheduled to be included in next transfer data is included in data of the transmission error, and in a case where the predetermined command is included in the data of the transmission error, reconstructing the next transfer data to be transferred to the recording head so as to cause the predetermined command to be included in the next transfer data, and then transmitting the next transfer data reconstructed.

10. The control method according to claim 9, wherein, in a case where there is a restriction in number of commands which are able to be included in the transfer data, the transmission process includes performing selection about commands concerning the control data based on a predetermined order of priority, and causing a selected command to be included in the transfer data.

* * * * *